United States Patent
Ramadan et al.

(10) Patent No.: US 11,476,530 B2
(45) Date of Patent: Oct. 18, 2022

(54) VEHICLE BATTERY ASSEMBLY

(71) Applicant: KARMA AUTOMOTIVE LLC, Irvine, CA (US)

(72) Inventors: Nadim F. Ramadan, Irvine, CA (US); Bailey Erin Fagan, Milford, MI (US); Edward Djrbashian, Glendale, CA (US)

(73) Assignee: Karma Automotive LLC, Irvine, CA (US)

( * ) Notice: Subject to any disclaimer, the term of this patent is extended or adjusted under 35 U.S.C. 154(b) by 0 days.

(21) Appl. No.: 16/814,659

(22) Filed: Mar. 10, 2020

(65) Prior Publication Data

US 2021/0288299 A1 Sep. 16, 2021

(51) Int. Cl.
*H01M 50/20* (2021.01)

(52) U.S. Cl.
CPC ........ *H01M 50/20* (2021.01); *H01M 2220/20* (2013.01)

(58) Field of Classification Search
CPC ..... H01M 50/20; H01M 2220/20; F16B 5/02; F16B 5/0283; F16B 35/041
See application file for complete search history.

(56) References Cited

U.S. PATENT DOCUMENTS

| | | | | |
|---|---|---|---|---|
| 4,306,708 A * | 12/1981 | Gassaway | ................ | F24F 1/10 248/635 |
| 4,435,112 A * | 3/1984 | Becker | ...................... | F16B 5/02 29/453 |
| 4,581,871 A * | 4/1986 | Blucher | ................ | F16B 5/0233 52/681 |
| 5,741,101 A * | 4/1998 | Gulistan | ................. | F16B 35/06 411/107 |
| 6,196,516 B1 * | 3/2001 | Lan | ........................ | G11B 33/08 |
| 7,086,688 B2 * | 8/2006 | Edwards | .............. | B62D 25/087 296/181.3 |
| 8,434,983 B2 * | 5/2013 | Chen | ..................... | F16B 5/0208 411/347 |
| 9,261,130 B2 * | 2/2016 | Hirayama | ............. | F16B 41/002 |
| 9,746,021 B2 * | 8/2017 | Kawashima | .......... | F16B 43/001 |
| 2013/0001391 A1 * | 1/2013 | Chiu | ..................... | F16B 5/0258 411/111 |
| 2013/0175424 A1 * | 7/2013 | Shimada | ................ | F16M 13/02 248/634 |
| 2014/0023452 A1 * | 1/2014 | Maloney | ............. | F16B 25/0021 411/166 |
| 2015/0079454 A1 * | 3/2015 | Maguire | ................. | B60L 50/66 429/159 |
| 2015/0167709 A1 * | 6/2015 | Buchta | .................... | F16B 19/02 411/546 |
| 2015/0240906 A1 * | 8/2015 | Wang | ...................... | F16F 1/376 248/615 |
| 2017/0268547 A1 * | 9/2017 | Mori | ...................... | B62D 27/02 |
| 2018/0326872 A1 * | 11/2018 | Osterhoff | ................ | F16B 19/02 |
| 2019/0072124 A1 * | 3/2019 | Pawlak | ............... | E04F 13/0801 |

* cited by examiner

*Primary Examiner* — Michael L Dignan
(74) *Attorney, Agent, or Firm* — Honigman LLP

(57) ABSTRACT

A vehicle battery assembly having specialized fasteners that includes an integrated compression limiter. The compression limiter provides protection for the fastening joint of a cover and a tray of a housing for the battery assembly. The battery assembly may also include nut and bolt assembly which may be installed by a nut insertion tool. The nut insertion tool allows the nut and bolt assembly to be installed without damaging the tray or the cover.

7 Claims, 8 Drawing Sheets

VEHICLE BATTERY ASSEMBLY

The present disclosure relates to various battery components related to a battery system for an electric vehicle. In particular, a cover for a battery of an electric vehicle and fastener systems associated with the cover.

Typically, an electric vehicle includes a high voltage battery assembly serving as the main power source for one or more propulsion motors driving the wheels of the vehicle. The battery assembly includes a cover in order to protect the battery cells from damage and the environment. The cover protects the high voltage battery from water by tightly sealing the battery. The cover may be made of plastic. Usually, covers are manufactured using injection molding or stampings. In this manufacturing process, compression limiters for the covers may be built into the cover with minimal cost. In a vacuum formed cover, compression limiters may need to be manually pressed which adds cost and time for producing the vehicle.

Fasteners in a vehicle assembly may also include nuts. These nuts may need to be inserted into deep and narrow channels, such as within the battery assembly. Typically, nuts are inserted via hole in the bottom of the structure. This hole is vulnerable to water and may allow water to leak inside sealed assemblies.

The disclosed embodiments include fasteners with integrated compression limiters. This allows the manufacturing process to not require an additional step of adding compression limiters.

Furthermore additional fasteners such as bolt and nut fasteners are present in assembly. A nut insertion tool may be provided in order to insert nuts into narrow or tight channels within the vehicle structure, such as within the battery assembly.

BRIEF DESCRIPTION OF THE DRAWINGS

The features, aspects, and advantages of the present disclosure will become apparent from the following description, and the accompanying exemplary embodiments shown in the drawings, which are briefly described below.

DETAILED DESCRIPTION

According to one disclosed embodiment of the disclosure, a battery assembly for a vehicle is disclosed. The battery assembly includes a housing. The housing includes a cover and a tray located under the cover, the cover including a first fastener hole. The tray including a second fastener hole. A fastener configured to be inserted through the first and second openings to fasten the cover to the tray, wherein the fastener includes a head, a compression limiter, a body, and a thread. The body of the fastener is configured to be inserted to the second fastener hole and wherein the thread is disposed outside of the body and is configured to engage the tray, and wherein the fastener is a monolithic structure.

According to another embodiment of the disclosure, a high voltage battery assembly is disclosed. The high voltage battery is configured to power propulsive motors for a vehicle, the battery assembly comprising, a housing including a cover and a tray located under the cover, plurality of fasteners configured to fasten the cover to the tray along the perimeter of the battery assembly. Each fastener of said plurality of fasteners includes a head with a slot, a compression limiter, a body, and a thread. The head of each fastener is configured to engage and provide a first bearing surface configured to engage the cover. The compression limiter of each fastener provides a second bearing surface configured to engage the tray. Wherein each fastener is a monolithic structure.

According to another embodiment of the disclosure, a fastener is disclosed. The fastener comprising a head having a slot, wherein the head is configured to engage a first layer, a compression limiter extending from the head opposite of the slot, a body. A portion of the body includes a thread configured to be fastened to a second layer located under the first layer. Wherein the fastener is a monolithic structure.

Figure 1:
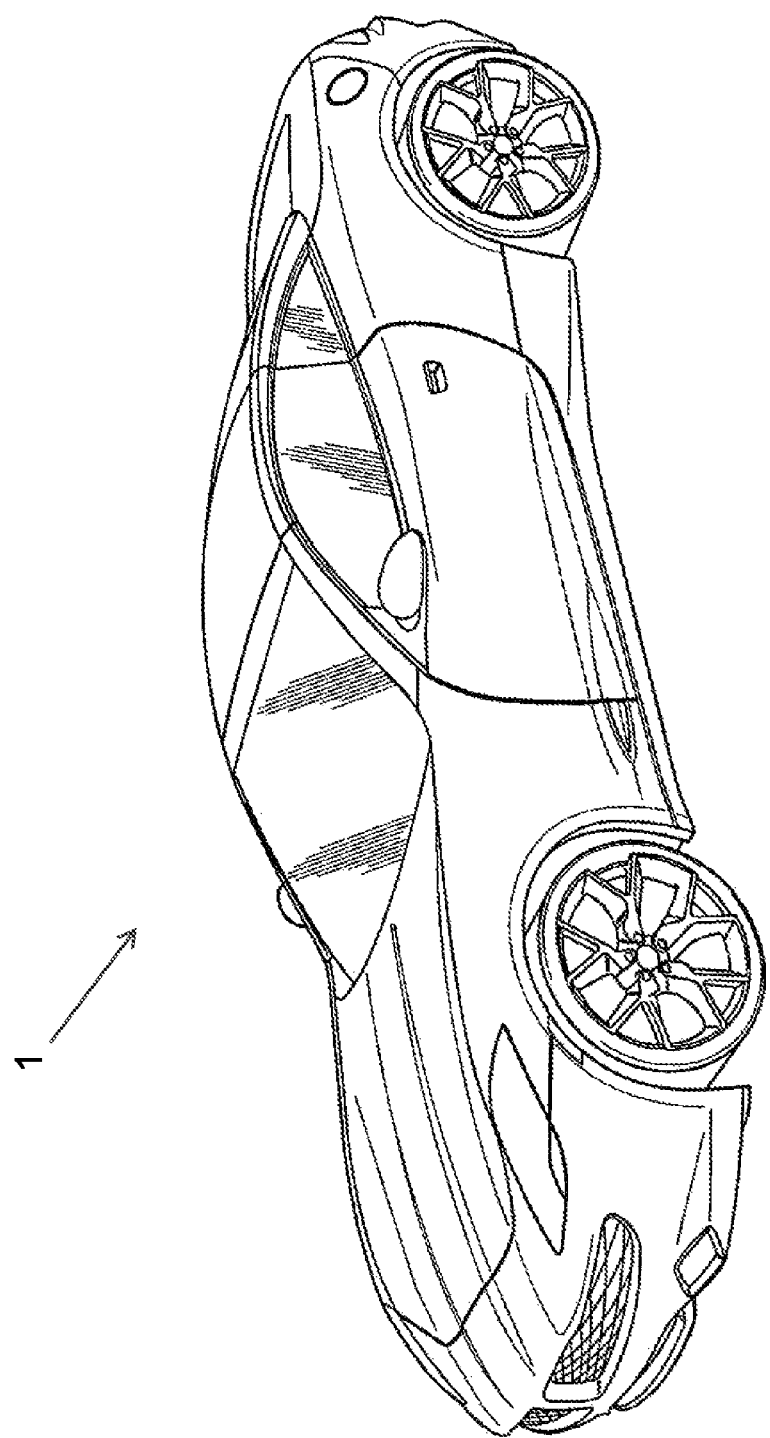
FIG. 1 is a vehicle with a battery assembly located within the vehicle.

FIG. 1 illustrates a vehicle 1 comprising a high voltage battery (inside the vehicle) that powers propulsive motors (not visible; inside the vehicle) that drives the wheels of the vehicle.

Figure 2:
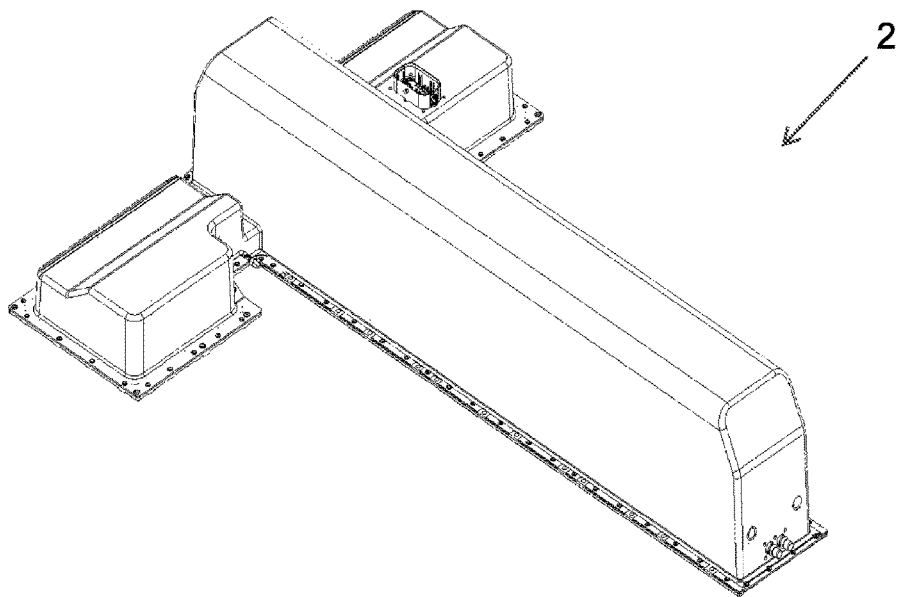
FIG. 2 is an isometric view of the battery assembly for the vehicle shown in FIG. 1.
Figure 3:
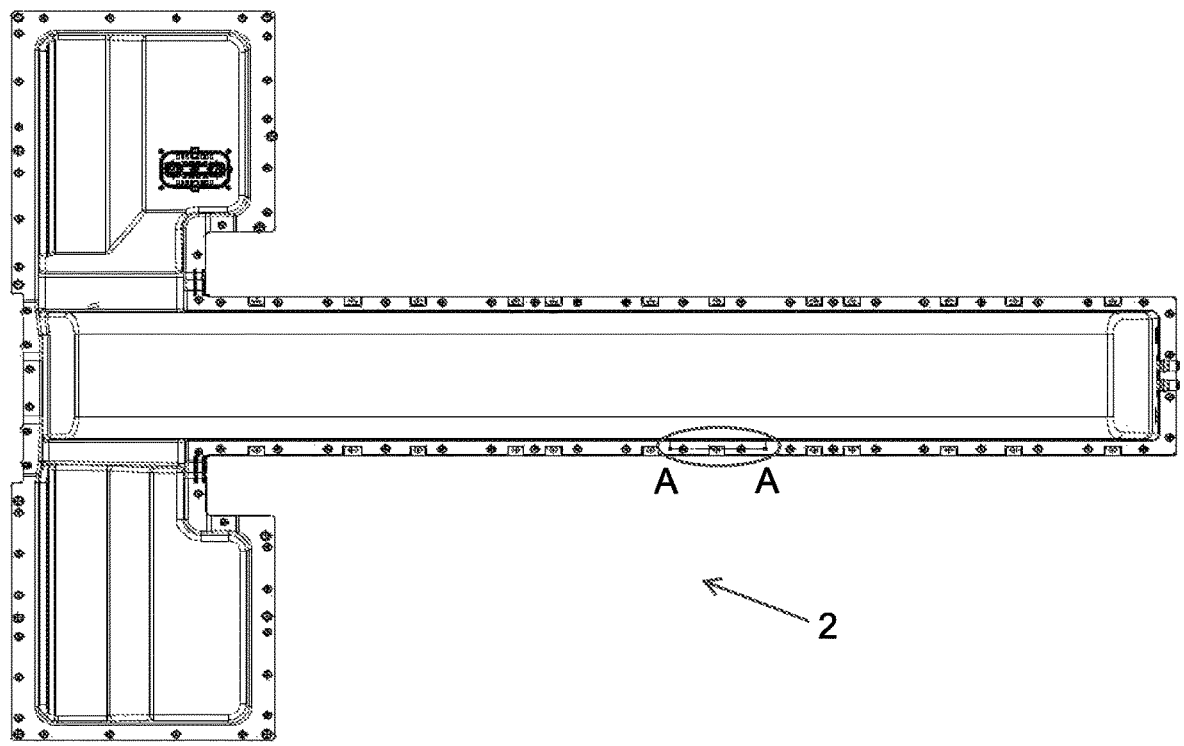
FIG. 3 is a top view of the battery assembly for the vehicle shown in FIG. 2.

FIGS. 2 and 3 is a high voltage battery assembly 2 that includes a housing 10. The housing 10 includes a cover 10a and a tray (not shown; under cover 10a) and are mated via a plurality of fasteners 12. The high voltage battery may be mounted or integrated to the vehicle. Section A-A labeled is shown as FIG. 4.

Figure 4:
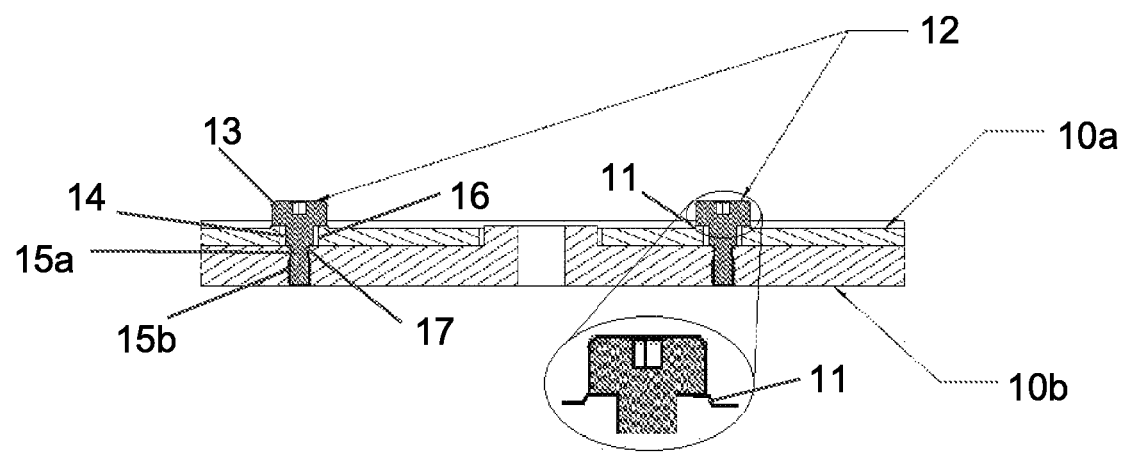
FIG. 4 is a sectional view A-A of the battery assembly shown in FIG. 3.

FIG. 4 is a sectional drawing showing the housing 10 with the cover 10a and the tray 10b. The first housing and second housing includes fastener holes 16 and 17 respectively. The fastener holes 16 and 17 are configured to be inserted with the fasteners 12. The fastener hole 16 of the cover 10a is configured to overlap and be coaxially disposed to fastener hole 17 of the tray 10b in order for fastener 12 to extend through. Each fastener 12 includes a head 13 and a stem portion. The stem portion includes a compression limiter 14 and a body portion. The body portion includes a non-threaded portion 15a, and a threaded portion 15b. The head 13 of the fastener 12 may include a slot 18 shaped and configured to receive a tool for turning the fastener 12. A polygonal slot 18 is shown but different shapes may be provided for the fastener head. The head 13 may be larger than the rest of the fastener 12 in order to keep the fastener from being driven further than the length of the fastener and in order to provide a bearing surface for the cover 10a. The body 15a, 15b of the fastener 12 is configured to extend into the tray, and the threaded portion 15b is is configured to fasten to the tray 10*b* via a threaded engagement. The length of the compression limiter 14 may be approximately equal to the thickness of the cover at the adjacent area of the fastener hole 17. The cover and the tray may include a plurality of fastener holes 16 and 17 each configured to receive a fastener 12 as shown in FIG. 4.

The primary function of the compression limiter 14 is to provide and maintain joint integrity of connected components. The compression limiter 14 is designed to protect the components of an assembly (e.g. tray 10*b* and cover 10*a* of the battery assembly) from the compressive loads generated by the tightening of the bolts, thereby assuring integrity of the bolted connection. The compression limiter 14 provides a bearing surface for the tray 10*b*. The compression limiter 14 strengthens the housing 10 by withstanding the compressive force that is applied when the fastener is tightened. The integrity of the housing 10 is not compromised by the load that is applied. Each fastener hole 16 of the cover 10*a* may include a raised lip 11 located at the opening of each fastener hole 16. The raised lip 11 may be disposed higher than the adjacent surface and is configured to be the bearing surface of the fasteners 12. The length of the compression limiter 14 may be approximately equal to or slightly less than the thickness of the cover 10*a* including the thickness of the raised lip 11. The radius of the raised lip may extend approximately equal to the maximum radius of the fastener head 13 or slightly past the maximum radius of the fastener head in order to accommodate for the bearing surface of the fastener.

Figure 5:
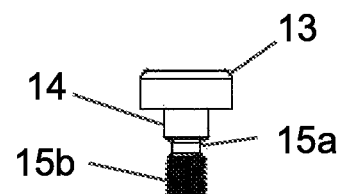
FIG. 5 is a side view of an exemplary fastener.

FIG. 5 shows an isolated fastener 12. The body 15*a* of the fastener 12 may be smaller than the outer diameter of the thread 15*b*. The fastener 12 may be of one piece or a monolithic structure.

Figure 6:
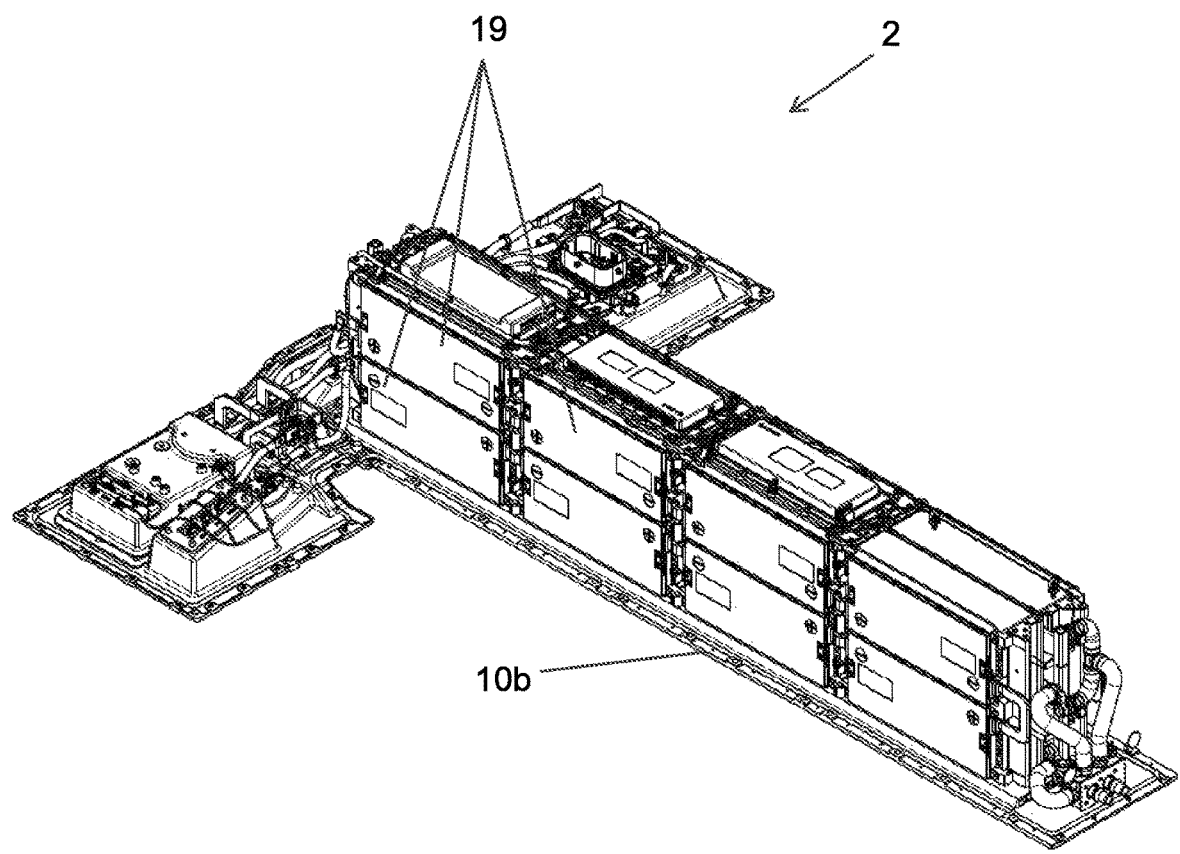
FIG. 6 is a side view of an exemplary battery assembly shown in FIG. 2 without the cover.

FIG. 6 shows the battery assembly 2 with cover 10*a* removed. The battery assembly includes a plurality of battery modules 19.

Figure 7:
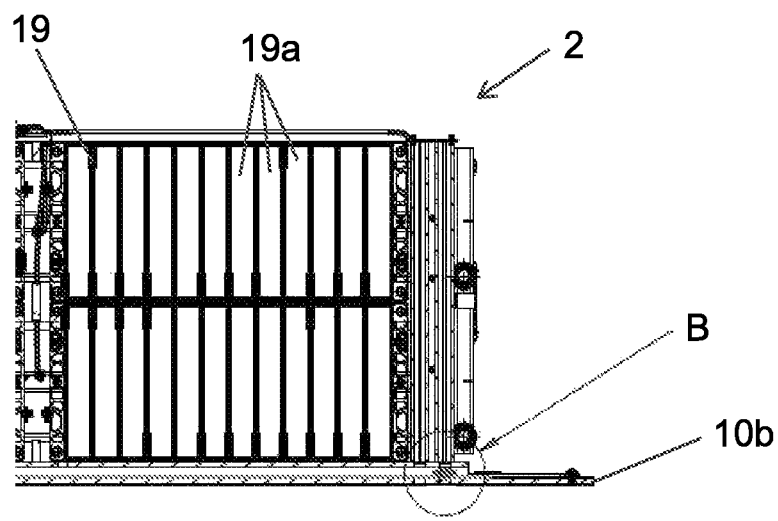
FIG. 7 is a side sectional view of the battery assembly shown in FIG. 6.

FIG. 7 shows the battery assembly 2 with the cover 10*a* removed. A battery module 19 may be disposed on top of the tray 10*b*. Each battery module may include one or more battery cells 19*a*. The battery assembly 2 may include one or more battery modules 19, but for clarity FIG. 6 only shows a single module 19. A fastener (not shown) may be provided to fasten the battery module 19 to the tray 10*b*. Encircled portion B is shown in FIG. 7.

Figure 8:
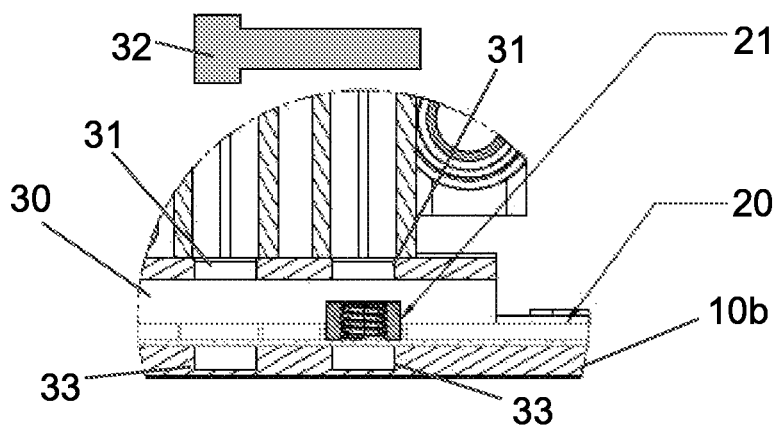
FIG. 8 is a close up of a battery assembly with a nut insertion tool at location B of FIG. 7.
Figure 9:
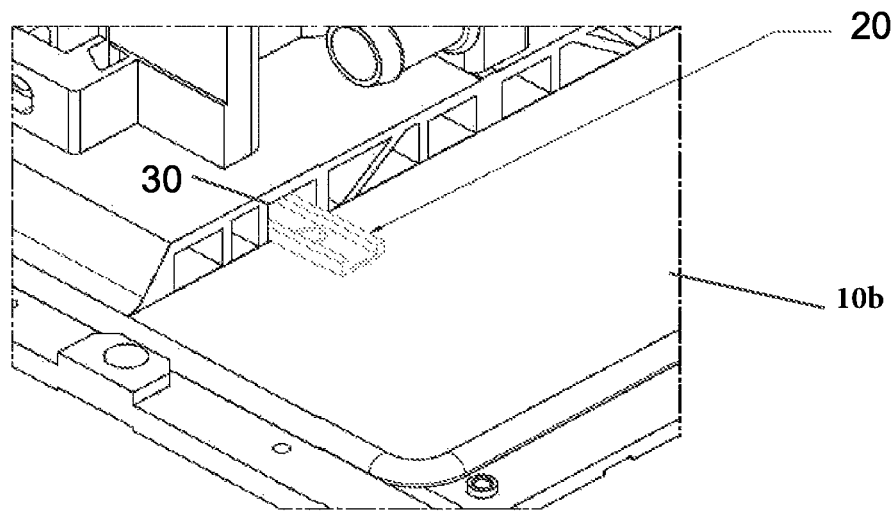
FIG. 9 is a close up of the nut insertion tool being inserted to the battery assembly.

As shown on FIGS. 8 and 9 a nut insertion tool 20 may be utilized for the assembly as an alternative for installing fasteners (e.g. nuts) without leaving holes on the assembly 2 (i.e. no openings required at the bottom of the tray). A nut 21 is configured to sit on the nut insertion tool 20 and is configured to receive a bolt 32 from above. A tunnel 30 is located on the underside the battery module 19 and is configured to receive nut(s) 21 and the nut insertion tool 20. The nut insertion tool may have a width less than the width as the tunnel 30 so as to be configured to be inserted to the tunnel to install the nuts to corresponding fastening holes 31 of the battery module 19. A bolt trench 33 may be disposed on the tray 10*b* below the fastening holes 31 in order to accommodate the extension of the bolt through the nut.

Figure 10:
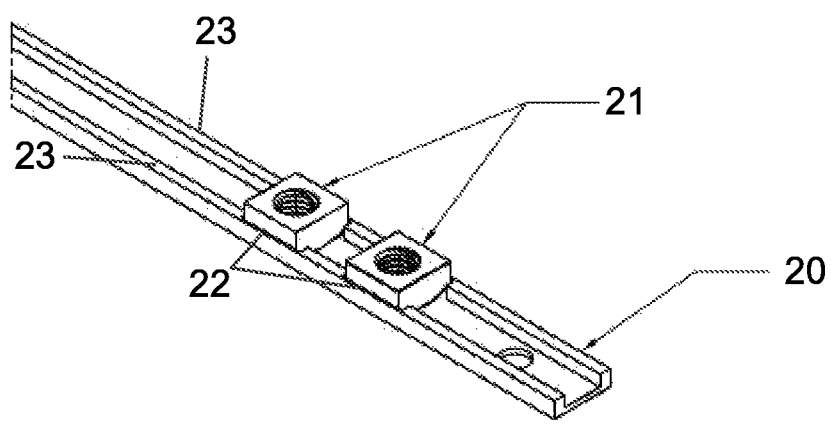
FIG. 10 is an isometric view of the nut insertion tool.
Figure 11:
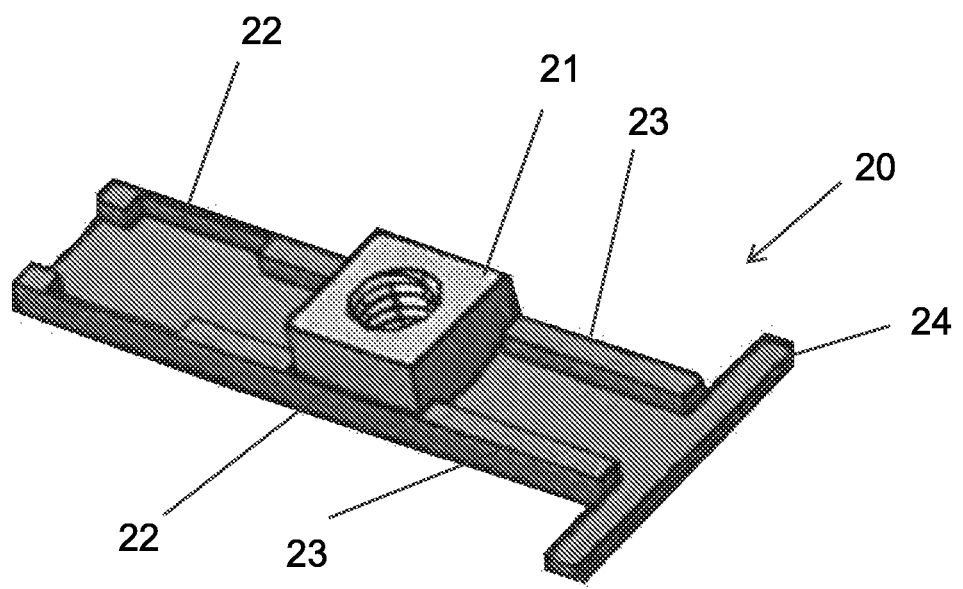
FIG. 11 is an isometric view of the nut insertion tool according to another embodiment.

FIG. 10 shows an isolated nut insertion tool 20 with nuts 21 disposed on slots 22 of the insertion tool 20. The slots 22 accommodate the shape of the nut 21. Rail 23 extends along the length of the insertion tool 20, and slots 22 are disposed within the rail 23. The rail is configured to hold the nut(s) 21 in place when the bolt 32 is inserted and tightened from above the nut(s) 21. The thickness of the rail 23 is reduced at the slot locations in order to accommodate for the nut. The dimensions of the insertion tool and slot may also be vary depending on the nut required to be installed to the system. Multiple slots 22 may be disposed along the rail, corresponding to different fastening points under the battery module 2. The number of slots may correspond to a number of fastening points of the battery module 2 along a line. The shape of the slot and nut may be a rectangular or square shape, however, other polygonal slot shape may be utilized to accommodate different nut shapes. FIG. 11 shows another embodiment of the nut insertion tool 20 with a stopper 24 configured to prevent the nut insertion tool from being inserted too far into the tunnel 30.

Figure 12A:
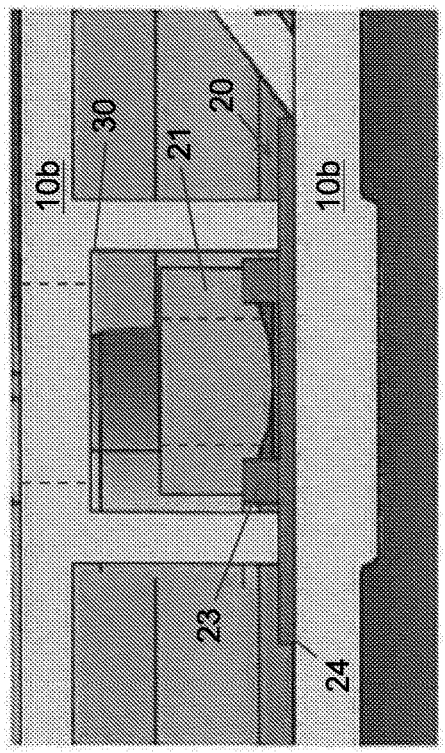
FIG. 12a shows a step in installing a nut into the assembly.
Figure 12B:
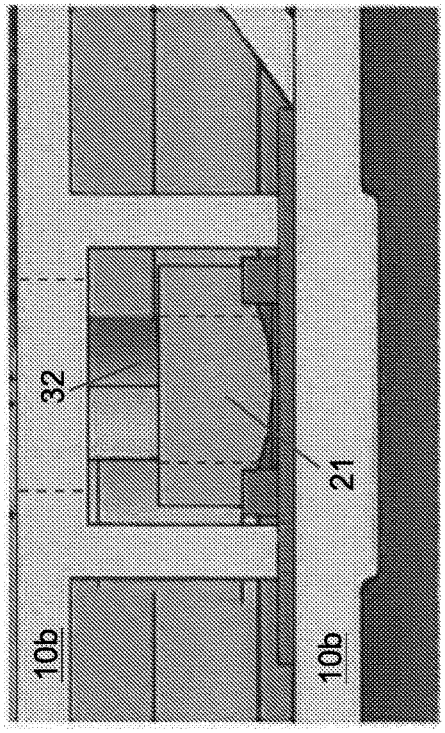
FIG. 12b shows a step in installing a nut into the assembly.
Figure 12C:
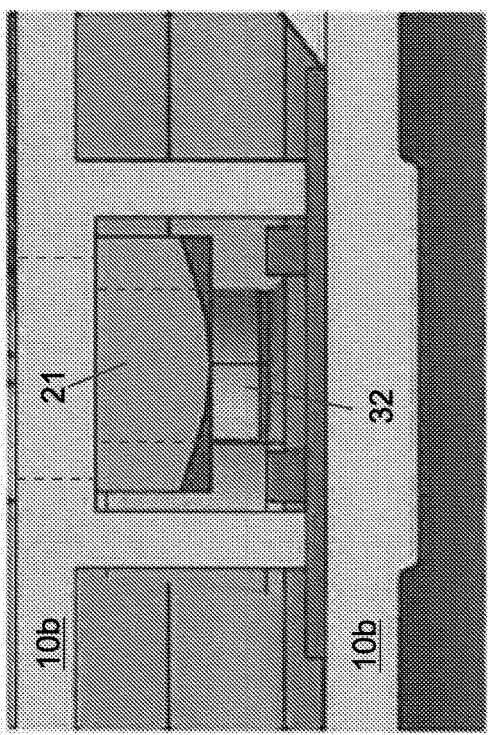
FIG. 12c shows a step in installing a nut into the assembly.

FIG. 12*a*-12*c* shows various stages of the installation process for a nut 21 within the tunnel 30 utilizing nut insertion tool 20. Before the nut insertion tool 20 is inserted to the tunnel 30, nut 21 is inserted to a slot 22 as shown in FIGS. 9 and 10. Multiple nuts 21 may be inserted to the tool 20 for each corresponding slot 22. Each slot may include a magnet (not shown) in order to keep the nuts within the slot. The magnet may be fastened onto the nut insertion tool 20 via an adhesive or may be included integrally into the tool 20. The tool 20 may be pushed into the tunnel such that the stopper 24 may be configured to align corresponding slot(s) 22 to the corresponding fastening hole(s) 31. After the nut 21/slot 22 has been aligned to the fastening hole 31, the bolt 32 is inserted to through the fastening hole 21 and may be screwed into the nut 21. As the bolt 32 is rotated into the nut, the bolt 32 will lift the nut. The rail 23 will prevent the nut from rotating. The height of the rail 23 may vary depending on the height of the tunnel. The height of the rail 23 will allow the nut 21 and bolt 32 to be tightened to the required tolerance of the assembly. Once the nut 20 and bolt 32 is tightened to the desired tolerance the tool may be removed and be placed in a different tunnel for other nut and bolt assemblies.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the battery assembly and fasteners as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

What is claimed is:

1. A battery assembly for a vehicle, the battery assembly comprising:
   at least one battery cell;
   a housing for enclosing the battery cell including a cover and a tray located under the cover, the tray comprising a top surface supporting the battery cell and a bottom surface disposed on an opposite side of the tray than the top surface;
   the cover including a first fastener hole;
   the tray including a second fastener hole;
   a fastener configured to be inserted through the first fastener hole and into the second fastener hole to fasten the cover to the tray, wherein the fastener includes a head and a stem portion, wherein the stem portion includes a compression limiter having a length substantially the same as a thickness of the cover and a body having a length that extends from the top surface of the tray to the bottom surface of the tray when the fastener is inserted through the first fastener hole and into the second fastener hole to fasten the cover to the tray, the body including a threaded portion and a non-threaded portion disposed between the compression limiter and the threaded portion when the fastener is inserted through the first fastener hole and into the second fastener hole to fasten the cover to the tray, wherein the diameter of the threaded portion is greater than the diameter of the non-threaded portion, and wherein the diameter of the compression limiter is greater than the diameter of the non-threaded portion;
   wherein the body of the fastener is configured to be inserted into the second fastener hole and wherein the threaded portion is configured to engage the tray;
   wherein the fastener is a monolithic structure;
   wherein the compression limiter is located immediately adjacent to the head and wherein length of the compression limiter is substantially the same as the thickness of the cover; and
   wherein, when the cover and the tray are fastened together, a first bearing surface of the head abuts a top surface of the cover and a second bearing surface of the compression limiter abuts the top surface of the tray to thereby limit the compression of the cover.

2. The battery assembly of claim 1, wherein the cover includes a raised lip located adjacent the opening of the first fastener hole; wherein said raised lip is configured to project above surfaces of the cover adjacent the lip.

3. The battery assembly of claim 2, wherein the raised lip is configured to engage the first bearing surface of the fastener.

4. The battery assembly of claim 3, wherein the radius of the raised lip is approximately equal to the maximum radius of the fastener head.

5. The battery assembly of claim 1, wherein the first fastener hole is larger than the second fastener hole.

6. The battery assembly of claim 5, wherein the first fastener hole is axially aligned to the second fastener hole.

7. The battery assembly of claim 1, wherein a length of the body is approximately equal to a thickness of the tray.

\* \* \* \* \*